United States Patent
Chen et al.

(10) Patent No.: US 8,086,031 B2
(45) Date of Patent: *Dec. 27, 2011

(54) REGION DETECTION (75) Inventors: Tong-Xian Chen, Beijing (CN); Xiangrong Chen, Beijing (CN); John C. Platt, Redmond, WA (US); Jie Yan, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/465,461

(22) Filed: May 13, 2009

(65) Prior Publication Data

US 2009/0238452 A1 Sep. 24, 2009

Related U.S. Application Data (63) Continuation of application No. 10/958,136, filed on Oct. 4, 2004, now Pat. No. 7,636,470, which is a continuation of application No. 09/783,505, filed on Feb. 13, 2001, now Pat. No. 6,895,112.

(51) Int. Cl.
*G06K 9/00* (2006.01)

(52) U.S. Cl. ..................................... 382/165

(58) Field of Classification Search .......... 382/162–167, 382/115–118, 274–275, 224–227, 260–266; 348/224.1–225.1, 576–580; 358/518–523

See application file for complete search history.

(56) References Cited

U.S. PATENT DOCUMENTS

| | | | |
|---|---|---|---|
| 5,432,863 A * | 7/1995 | Benati et al. | 382/167 |
| 5,748,764 A | 5/1998 | Benati et al. | |
| 5,990,973 A | 11/1999 | Sakamoto | |
| 6,009,209 A | 12/1999 | Acker et al. | |
| 6,016,354 A | 1/2000 | Lin et al. | |
| 6,134,339 A | 10/2000 | Luo | |
| 6,151,403 A | 11/2000 | Luo | |
| 6,204,858 B1 | 3/2001 | Gupta | |
| 6,285,410 B1 | 9/2001 | Marni | |
| 6,292,574 B1 | 9/2001 | Schildkraut et al. | |
| 6,407,777 B1 | 6/2002 | DeLuca | |
| 6,665,434 B1 | 12/2003 | Yamaguchi | |
| 6,728,401 B1 | 4/2004 | Hardeberg | |
| 6,895,112 B2 | 5/2005 | Chen et al. | |
| 7,024,035 B1 * | 4/2006 | Enomoto | 382/167 |

(Continued)

FOREIGN PATENT DOCUMENTS

JP 09261580 A 10/1997

OTHER PUBLICATIONS

"Digital Still Camera Image File Format Standard (Exchangeable images file format for Digital Still Cameras: Exit) Version 2.1" Japan Electronic Industry Development Association (JEIDA) Jun. 12, 1998 172 pages.

(Continued)

*Primary Examiner* — Ishrat I Sherali (74) *Attorney, Agent, or Firm* — Lee & Hayes, PLLC (57) ABSTRACT

Disclosed herein are systems methods and devices related to region detection of an image. Detected regions include pixels of a particular one or more colors without requiring faces within the image to be previously detected. Region detection may include receiving information that a flash was used to capture the image or that return light was detected in the image.

3 Claims, 5 Drawing Sheets

U.S. PATENT DOCUMENTS

| | | |
|---|---|---|
| 7,042,505 B1 | 5/2006 | DeLuca |
| 7,116,820 B2 | 10/2006 | Luo et al. |
| 7,155,058 B2 | 12/2006 | Gaubatz et al. |
| 2005/0041121 A1 | 2/2005 | Steinberg et al. |

OTHER PUBLICATIONS

Garcia, et al., "Face Detection Using Quantized Skin Color Regions Merging and Wavelet Packet Analysis" IEEE Transactions of Multimedia vol. 1 No. 3 Sep. 1999 pp. 264-277.

Osuna, et al., "Support Vector Machines: Training and Applications" Massachusetts Institute of Technology A.I. Memo No. 1602 C.B.C.L. Paper No. 144 Mar. 1997 43 pages.

Rowley, et al., "Neural Network-Based Face Detection" IEEE 1998 28 pages.

Turk, et al., "Face Recognition Using Eigenfaces" IEEE 1991 pp. 586-591.

Yang, et al., "Tracking Human Faces in Real-Time" Carnegie Mellon University CMU-CS95-210 1995 34 pages.

\* cited by examiner

REGION DETECTION

RELATED APPLICATIONS

This is a continuation of Application Ser. No. 10/958,136, filed Oct. 4, 2004, now U.S. Pat. No. 7,636,470 entitled "Red-Eye Detection Based on Red Region Detection With Eye Confirmation", which is a continuation of application Ser. No. 09/783,505, filed Feb. 13, 2001, now U.S. Pat. No. 6,895,112 entitled "Red-Eye Detection Based On Red Region Detection With Eye Confirmation," which is hereby incorporated by reference herein.

TECHNICAL FIELD

This invention relates to detecting red eye, and more particularly to red-eye detection based on red region detection with eye confirmation.

BACKGROUND

Red-eye is a problem commonly encountered in photography when light (typically from the camera's flash) reflects off the retinas at the back of the subject's eyes and causes the subject's eyes to turn red. Red-eye has been a problem for many years, and although a variety of solutions have been proposed to cure the problem, these solutions tend to be costly, cumbersome, and/or ineffective. One such solution is to use a bounce flash so that light hits the subject's eyes from the side (or above/below) rather than straight-on, thereby preventing the reflected light from coming straight back to the camera's lens. Bounce flashes, however, are cumbersome (often rivaling the size of the camera) and costly. Another solution is to pre-flash the subject, thereby causing the subject's pupils to close and decrease the amount of light allowed into the subject's eyes when the picture is taken. These pre-flash solutions, however, are not always effective, and cause a delay (while the pre-flash is operating) before the picture is actually taken during which time the subject may move.

Attempts have also been made to cure the red-eye problem after-the-fact by processing the image to remove the red from the eyes. Computer software packages are available that allow for the removal of red-eye, such as by changing the color of the red portion of the eye. Some systems require manual selection, by the user, of the pixels within the image that are part of the red eyes prior to removing the red-eye. These systems are rather user un-friendly due to the steps the user must follow to identify exactly which pixels are part of the red eyes.

Other systems have attempted to automatically detect where the red-eye portions of an image are (as opposed to other non-eye portions of the image that are red). Such systems typically start by using face detection techniques to determine where any faces are in the image and where eyes are within those faces. Once these faces (and eyes within them) are detected, the systems try to determine whether the eyes are red eyes. These systems, however, can have poor performance under many circumstances (e.g., when a face is partially obscured, such as by heavy shadows or heavy beards, when the face has an unusual expression or is distorted, etc.).

The invention described below addresses these disadvantages, providing improved red-eye detection systems and methods.

SUMMARY OF THE INVENTION

Red-eye detection based on red region detection with eye confirmation is described herein.

In accordance with one aspect, pixels that correspond to the color of red-eye within an image are identified. A determination is then made as to whether these identified pixels and surrounding areas are part of an eye or not part of an eye. Those identified pixels that are determined to be part of an eye are the detected red-eye regions.

In accordance with another aspect, a skin color filter is initially applied to a received image to identify areas of the image that include skin color. Those areas are then searched to identify red pixels within the areas. Adjacent red pixels (or those red pixels close enough to one another) are grouped together and a shape filter applies several rules to the pixel groupings. Pixel groups remaining after the filtration process are candidate red-eye regions. These candidate red-eye regions are input to an eye confirmation process which uses a multi-scale process to confirm whether each candidate red-eye region is part of an eye.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
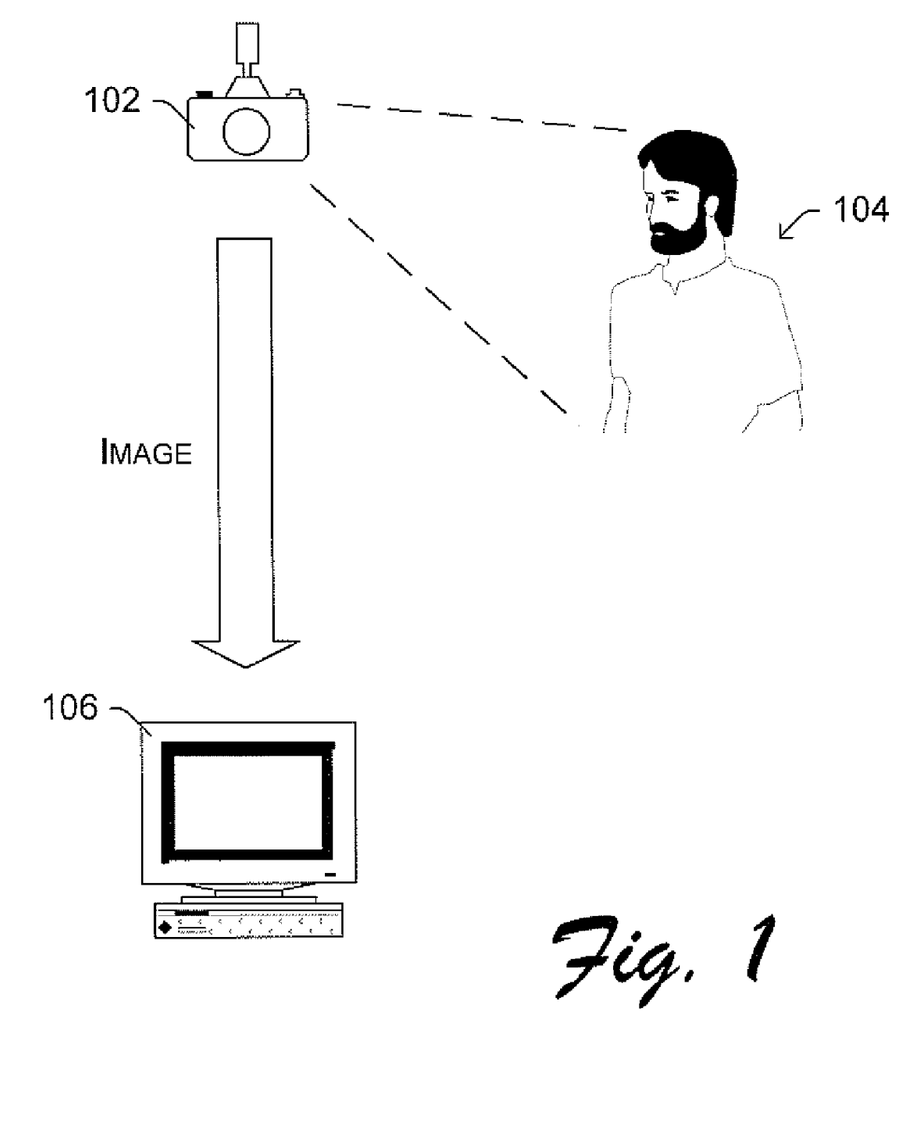
FIG. 1 illustrates an exemplary environment in which the present invention may be practiced.

FIG. 1 illustrates an exemplary environment in which the present invention may be practiced. A camera 102 is used to take a picture(s) of a subject 104 using a flash on camera 102 that potentially causes red-eye in images captured of subject 104. These images captured by camera 102 (commonly referred to as a picture being taken) are analyzed for red-eye and the areas with red-eye automatically detected as discussed in more detail below. The red-eye detection can be performed at camera 102, or alternatively the captured images may be transferred to a computing device 106 that detects red-eye. Device 106 may be any of a wide variety of devices, such as a desktop or portable computer, copying or printing devices (e.g., a photograph enlargement device including a scanner and printer), etc.

Camera 102 may be any type of image capture device that captures and stores (or communicates) images, such as a film camera, a digital camera, a video camera, a camcorder, etc. Camera 102 may capture images in any of a variety of conventional manners, such as exposing film on which the image is captured, exposing one or more charge coupled devices (CCDs) and storing a captured still image in memory (e.g., a removable Flash memory, hard disk (or other magnetic or optical storage medium), or motion video tape), exposing one or more CCDs and storing multiple captured frames (a captured video sequence) on a recording medium (e.g., Flash memory, disk or tape), etc.

Figure 2:
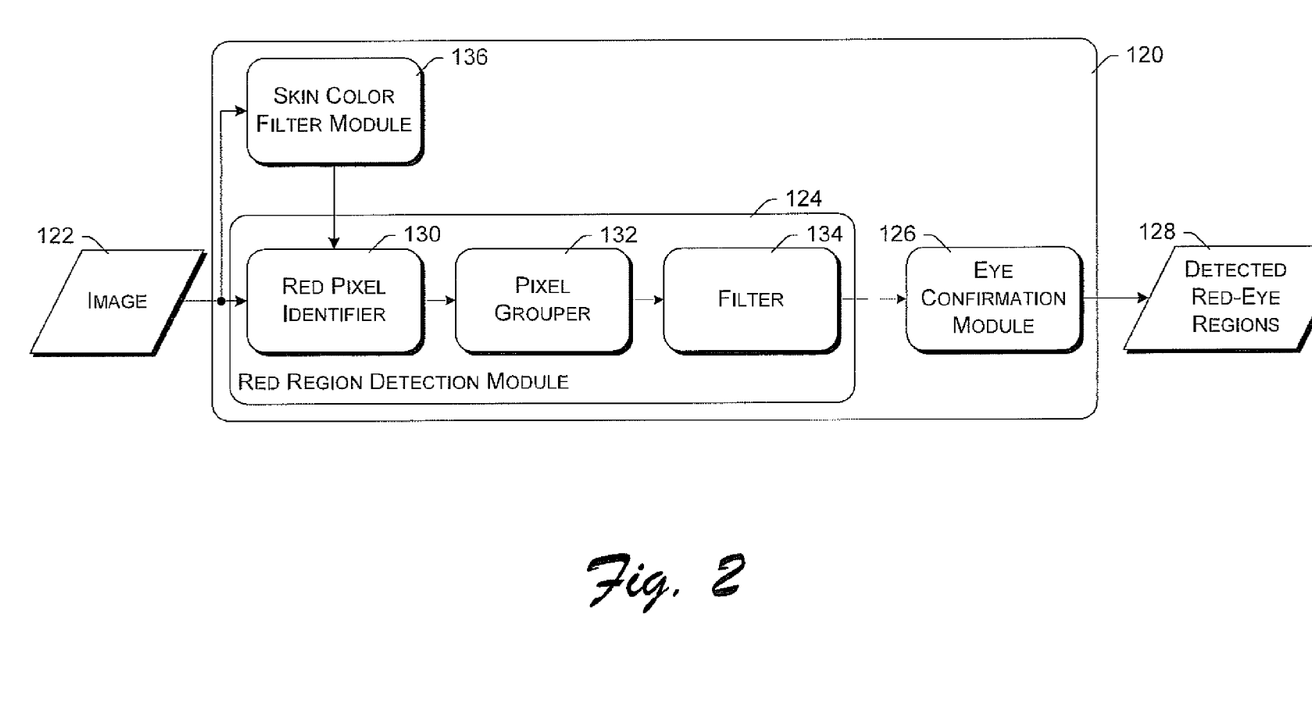
FIG. 2 illustrates an exemplary system for performing red-eye detection in accordance with certain embodiments of the invention.

FIG. 2 illustrates an exemplary system 120 for performing red-eye detection in accordance with certain embodiments of the invention. System 120 can be implemented in any of a wide variety of devices, such as computers (whether desktop, portable, handheld, etc), image capture devices (e.g., camera 102 of FIG. 1), etc. Alternatively, system 120 may be a standalone system for coupling to (or incorporation within) other devices or systems.

System 120 receives an image 122 into a red region detection module 124. Image 122 is received in digital format, but can be received from any of a wide variety of sources including sources that capture images in a non-digital format (e.g., on film) but that are subsequently converted to digital format (digitized). In the illustrated example, image 122 is made up of multiple pixels that can be referenced in a conventional manner using an x, y coordinate system. Red region detection module 124 detects red regions that are potentially regions of red-eye and identifies those detected regions to an eye confirmation module 126. Eye confirmation module 126 confirms each detected region as being either part of an eye or not part of an eye, and outputs an indication 128 of those detected regions that are confirmed as being parts of eyes. The identified detected red-eye regions 128 can then be made available to other systems for further processing, such as automatic removal of the red-eye regions (e.g., by changing the red color to black).

Red region detection module 124 includes a red pixel identifier 130, a pixel grouper 132, and a filter 134. Image 122 is received by red pixel identifier 130 which analyzes image 122 on a per-pixel basis and identifies which of the pixels are "red" pixels. These identified red pixels are those pixels having a color that is associated with the colors typically found in red-eye. Identifier 130 may analyze each pixel in image 122, or alternatively only a subset of the pixels in image 122. For example, if a large number of red pixels in a circular pattern are identified then some of the pixels in the center of that pattern need not be analyzed. By way of another example, analysis of some other pixels may simply be skipped (e.g., at the corners or edges of the image), although skipping such analysis may degrade the performance of the red-eye detection.

In one implementation, skin color filter module 136 detects those areas of image 122 that include skin color and communicates those images to identifier 130, thereby allowing identifier 130 to analyze only those pixels that are within the areas that include skin color. Different skin color filters can be applied by module 136, and in one implementation a skin color classifier is used in which color quantization of the original image is initially performed in order to improve skin color segmentation by homogenizing the image regions. The quantized color image is then segmented according to skin color characteristics based on either the YCbCr color model or the HSV (Hue, Saturation, Value) color model. This color quantization and image segmentation is discussed in more detail in Christophe Garcia and Georgios Tziritas, "Face Detection Using Quantized Skin Color Regions Merging and Wavelet Packet Analysis", IEEE Transactions on Multimedia, Vol. 1, No. 3, September 1999, which is hereby incorporated by reference.

Given that red-eye is not typically a single shade of red, pixel identifier 130 uses a red-eye color model to which the color of each pixel being analyzed is compared. Based on this comparison to the red-eye color model, pixel identifier 130 determines whether the pixel is or is not a red pixel.

In the illustrated example, the pixels of image 122 are 24-bit color pixels that are represented using the conventional RGB (Red, Green, Blue) color model, in which three different dots (one red, one green, and one blue) are energized to different intensities to create the appropriate color for the pixel. The 24 bits of color information identify the intensity that each of the three different dots is to be energized to in order to display the pixel. The RGB color model is well known to those skilled in the art and thus will not be discussed further except as it pertains to the present invention.

Identifier 130 converts the 24-bit color model using RGB into a two-dimensional space referred to herein as the g and γ characteristics. The g and γ characteristics are determined based on the three components of the RGB model as follows:

$$g = \frac{G}{R+G+B}$$

$$\gamma = \frac{R}{R+G+B}$$

This two-dimensional space using the g and γ characteristics is previously trained (e.g., offline) using multiple color samples from known red-eye pixels. This results in a two-dimensional Gaussian distribution for red-eye colors based on the g and γ characteristics. Once the g and γ characteristics are generated for the pixel being analyzed, the g and γ characteristics for that pixel are compared to the Gaussian distribution. If the g and γ characteristics of the pixel are within a threshold probability of the Mixture Gaussian distribution, then identifier 130 determines that the pixel is a red pixel; otherwise identifier 130 determines that the pixel is not a red pixel. In one implementation, the threshold probability is 0.6, although different values could alternatively be used.

Identifier 130 outputs an identification of each of the red pixels to pixel grouper 132. This identification can take any of a variety of forms, such as an x, y coordinate position of each pixel. Each of the identified pixels is a candidate red-eye pixel. Pixel grouper 132 groups together the candidate red-eye pixels identified by identifier 130 into one or more pixel groups. Pixel grouper 132 groups together any two adjacent candidate red-eye pixels into the same pixel group. In one implementation, two pixels are adjacent if each of their x and y coordinate values differs by no greater than one. Thus, each pixel surrounding a given pixel (whether above, below, to the left, to the right, or at a diagonal) is an adjacent pixel. Alternatively, surrounding diagonal pixels may not be considered adjacent. Pixel grouper 132 may optionally group together two candidate red-eye pixels that are not adjacent but are within a threshold distance of one another (e.g., separated by not more than one or two pixels) into the same group. Pixel grouper 132 then identifies these pixel groups (which includes any single pixels as their own groups) to filter 134.

Filter 134 filters the pixel groups received from pixel grouper 132 based on a set of one or more heuristic rules. Filter 134 identifies certain pixel groups as being potential (or candidate) red-eye regions based on these rules and outputs an identification of the candidate red-eye regions to eye confirmation module 126.

In one implementation, filter 134 begins by assuming all of the pixel groups received from grouper 132 are candidate red-eye regions, and then uses the following five rules to eliminate pixel groups. The pixel groups remaining (if any) after application of these rules are the candidate red-eye regions output to eye confirmation module 126.

Rule 1) If the entire image is red (e.g., greater than a threshold number amount of the pixels in the picture are red, such as 95%) then none of the pixel groups are red-eye regions.

Rule 2) A pixel group containing too few pixels (e.g., five or less) is not a red-eye region.

Rule 3) A pixel group that is more rectangular than circular is not a red-eye region. The shape of a pixel group can be determined in any of a wide variety of conventional manners, such as based on the circumference of the group.

Rule 4) A pixel group having an aspect ratio substantially different from a circle is not a red-eye region. The aspect ratio of the pixel group can be identified by calculating the distance between the rightmost and leftmost pixels in the group (the horizontal aspect), as well as the distance between the uppermost and lowermost pixels in the group (the vertical aspect). The aspect ratio is then the horizontal aspect divided by the vertical aspect. For a circle, the aspect ratio is one. In the illustrated example, a pixel group with an aspect ratio less than a lower bound or greater than an upper bound is not a red-eye region. In one implementation, the lower bound is 0.5 and the upper bound 2.0.

Rule 5) A pixel group having a low filling ratio (e.g., less than 0.6) is not a red-eye region. The filling ratio is the number of red pixels in the group divided by the product of the horizontal aspect and the vertical aspect (as described in Rule 4).

Filter 134 identifies the resultant candidate red-eye regions to eye confirmation module 126. This identification can take any of a variety of forms, such as the x, y coordinates of each pixel in the grouping, one pixel of the grouping (e.g., at the center) and the size of the grouping, a single pixel of the grouping (e.g., at the center), etc. Eye confirmation module 126 moves a window the size of an eye template (also referred to as an eye detector) around the image (e.g., starting with the eye template at or close to the center of the grouping) and determines whether the pixels of the image within the windows match the eye template. The eye template is trained based on multiple previously analyzed (e.g., offline) eyes, which includes both the pupil areas (which include the red-eye portion) and the areas surrounding the pupil (which may include, for example, the iris and the sclera, as well as possibly the skin, eyelashes, and eyebrows surrounding the eyeball, etc.). The eye confirmation module 126 analyzes the area surrounding the candidate red-eye regions to determine whether the regions are part of an eye (and thus truly red-eye regions) or not part of an eye (and thus not red-eye regions). However, only areas close to the pupil are analyzed (the entire face is not detected). In one implementation the window is 25 pixels (horizontally) by 15 pixels (vertically), although windows of other sizes may be used.

To perform the confirmation for a particular candidate red-eye region, the window is positioned over (e.g., centered on) the red-eye region and the pixels within the window are classified, based on the eye template, as being either an eye or not an eye. If the pixels are classified as an eye, then no further analysis need be made for that eye. Alternatively, additional analysis may be performed (by moving the window over the image in the horizontal and/or vertical directions and repeating the classification) in order to identify the actual location (boundaries) of the eye (e.g., the eyeball, including the pupil, iris, and sclera). However, if the pixels are classified as not an eye, then the window is adjusted in the horizontal and/or vertical direction and the classification repeated. The window can be moved around multiple times and in multiple directions in an attempt to "locate" the eye if the candidate red-eye region is indeed a red-eye region. In one implementation, movement of the window is limited to ranging from −3 pixels to +3 pixels from the starting location in both the horizontal and vertical directions.

The classification of the pixels within the window based on the trained eye template can be performed using any of a wide variety of conventional classification schemes. In one implementation, a conventional SVM (Support Vector Machine) classifier is trained using both images of eyes and images of objects similar to eyes but that are not eyes. Based on this training, the SVM classifier can classify the pixels in a window as being either an eye or not an eye. In another implementation, the pixels in the window are normalized to account for variations in lighting conditions and then projected onto an eigenspace representation which returns a feature vector for the candidate eye region. This feature vector is then input to a neural network trained with images of eyes, which classifies the feature vector as either an eye or not an eye. The operation and use of SVM and neural networks for classification are both well-known to those skilled in the art and thus will not be discussed further except as they pertain to the present invention.

In the illustrated example, the size of the eye template and the size of the window are both fixed. Thus, some accommodation is made to account for the different sizes of eyes that may appear in images (e.g., based on how close the camera is to the subject, the size of the subject, how much the camera may have been "zoomed" for the picture, etc.). In one implementation, rather than having a fixed size eye template and window, multiple different-sized eye templates and windows are used to accommodate for these differences.

Figure 3:
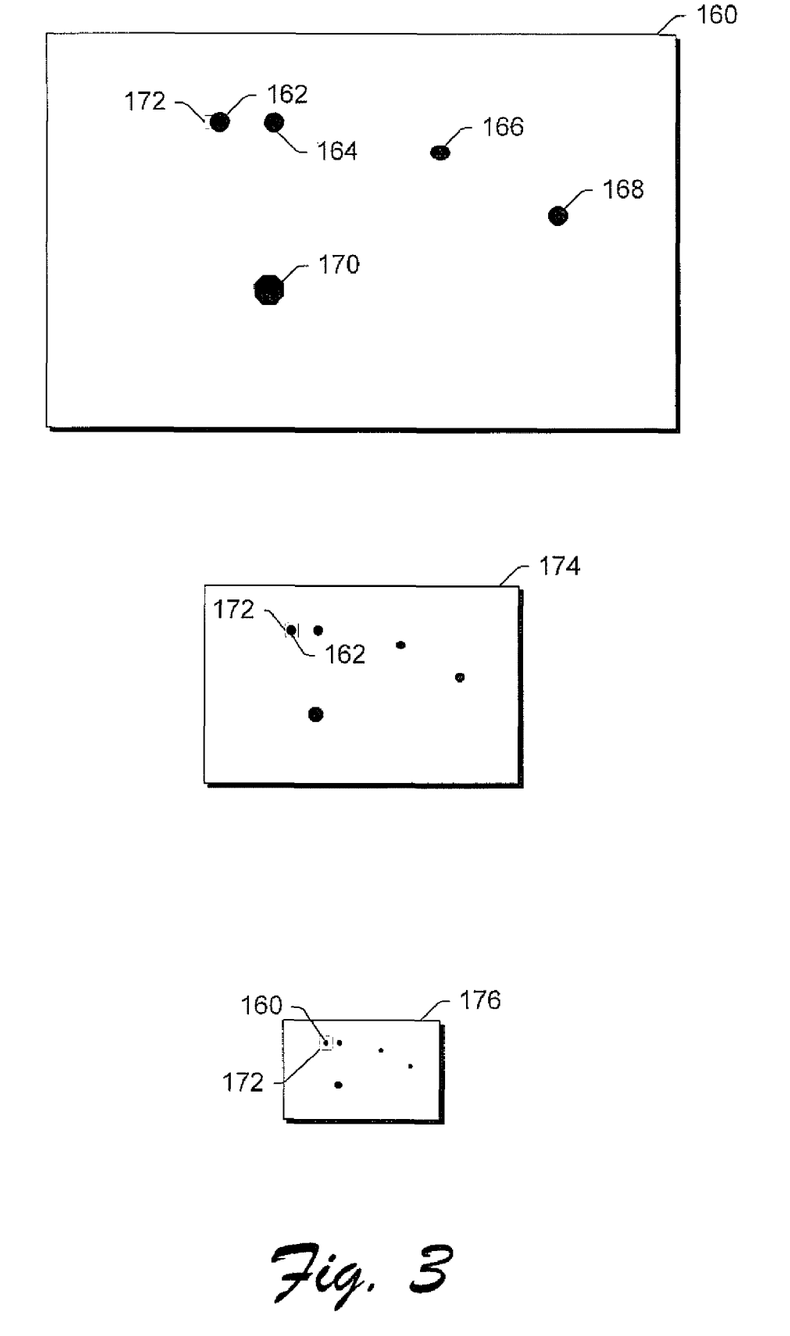
FIG. 3 illustrates an example of scaling an image in accordance with certain embodiments of the invention

In another implementation, the eye template and window sizes remain fixed, but the scale of the image is modified. FIG. 3 illustrates an example of the scaling of the image in accordance with certain embodiments of the invention. An image 160 is illustrated including multiple candidate red-eye regions 162, 164, 166, 168, and 170. For ease of illustration and to avoid cluttering the drawings, only the candidate red-eye regions are illustrated (other elements of the picture are not shown). Assume that the candidate red-eye regions 162 and 164 are actually red-eye regions, but that the regions 166, 168, and 170 are not. A window 172 is shown that covers some of the pixels of region 162, but not all of the region. This remains true regardless of how window 172 is moved over image 160. In other words, the region 162 is larger than the window size 172 (e.g., the camera may have been very close to the subject when the picture was taken). Thus, it is unlikely that the classification process will identify region 162 as a red-eye region.

As part of the multiple-scale process, image 160 is "scaled down" by 50% to generate image 174. Scaling down the image by a certain amount reduces the number of pixels by that amount, which may be accomplished by combining pixels. Such scaling of an image can be performed in any of a wide variety of conventional manners. The window 172 remains the same size, but the region 162 is reduced in size by 50%. The size of window 172 is now greater than the size of region 162, but not by much. It is still possible that the classification process may not identify region 162 as a red-eye region. Thus, image 172 is also scaled down by 50%, resulting in image 176. Window 172 is now a good deal larger than region 162, and it is likely that the classification process will now identify region 162 as a red-eye region.

Although using a large number of scaling levels is good for red-region confirmation, it may also become time-consuming. Thus, in order to reduce the time required, in one implementation three scaling levels are used. The initial scale is determined by the red region size, that is, the average of the size of the red region's horizontal aspect and vertical aspect. For example, for a 10-pixel size red region the initial scale is 1, while for a 20-pixel size red region the initial scale is 0.5 (reduced in size by 50%), etc. The second scale is the image from the initial scale reduced in size by ⅚ (0.8333), and the third scale is the image from the second scale reduced in size by another ⅚ (0.8333).

Returning to FIG. 2, eye confirmation module 126 outputs, as detected red-eye regions 128, each of the red-eye candidate regions that are confirmed as being eyes. In one implementation, the detected red-eye regions 128 are identified by the center of the eye and the size of the eye (e.g., in pixels) that includes the red-eye region. Alternatively, other identifications may be used, such as an identification of each of the red pixels within the pixel group that makes up the red-eye region.

In the discussions above, reference is made to "red-eye" detection. It is to be appreciated that this is typically various shades of the color red in images that people view, but may be different colors in different media. For example, conventional film cameras capture images on film which is then processed or developed resulting in what is typically referred to as a "negative". A printing process can then be used to print a color picture (or digitally capture a color picture) from this negative. However, the colors that constitute "red-eye" on a negative are not red. Nonetheless, the invention can be used to detect red-eye on negatives by re-training red pixel identifier 130 of FIG. 2 to detect the appropriate negative colors for red-eye. The negative image can then be digitized and the resultant digital image analyzed for red-eye.

Similarly, different animals may have red-eye that is in slightly different shades of red than humans. Such red-eye can also be detected by the invention by re-training red pixel identifier 130 of FIG. 2 to detect the appropriate shades for red-eye in the animal(s) being photographed. Similarly, different animals will have different eye shapes, and these too can be accounted for with the present invention by re-training the classifier used by eye confirmation module 126 of FIG. 2.

Additionally, other information may be incorporated into the red-eye detection process. For example, information regarding whether a flash was used in capturing the image may be used as part of the detection process—if no flash was used then the red-eye detection process can simply determine that no red-eye exists in the image. This information may be available to the red-eye detection process by the camera (e.g., if the red-eye detection system is implemented in a camera), or flash information may be stored along with the captured image (e.g., on film, or accompanying a digital image), etc.

In one implementation, captured images are stored digitally using a data structure with a corresponding header. One example of such a header (often used with JPEG-compressed files) is the Exchangeable Image File format (Exif), including current and future versions of the format (additional information on the Exif format is available from the Japan Electronic Industry Development Association). This header information includes an indication as to whether a flash was used in capturing the image. For digitally captured images, the digital camera that captures the images will set or clear a flag within this header (the "Flash" tag in Exif) for each image to indicate whether the camera's flash was used for capturing each of the images. The red-eye detection process described herein can check the header information for an image and, if the header information indicates that no flash was used, then the process can quickly determine that no red-eye exists without requiring further analysis of the image. Such quick determinations can decrease the time required to process images, as well as reduce false indications of red-eye. Alternatively, the header may also including information (e.g., within the "Flash" tag in Exif) as to whether return light from the flash was detected at the camera. If no return light was detected, then the red-eye detection process may assume that there was insufficient flash light for the picture and thus insufficient flash light for red-eye to result (and thus quickly determine that no red-eye exists without requiring further analysis of the image).

Figure 4:
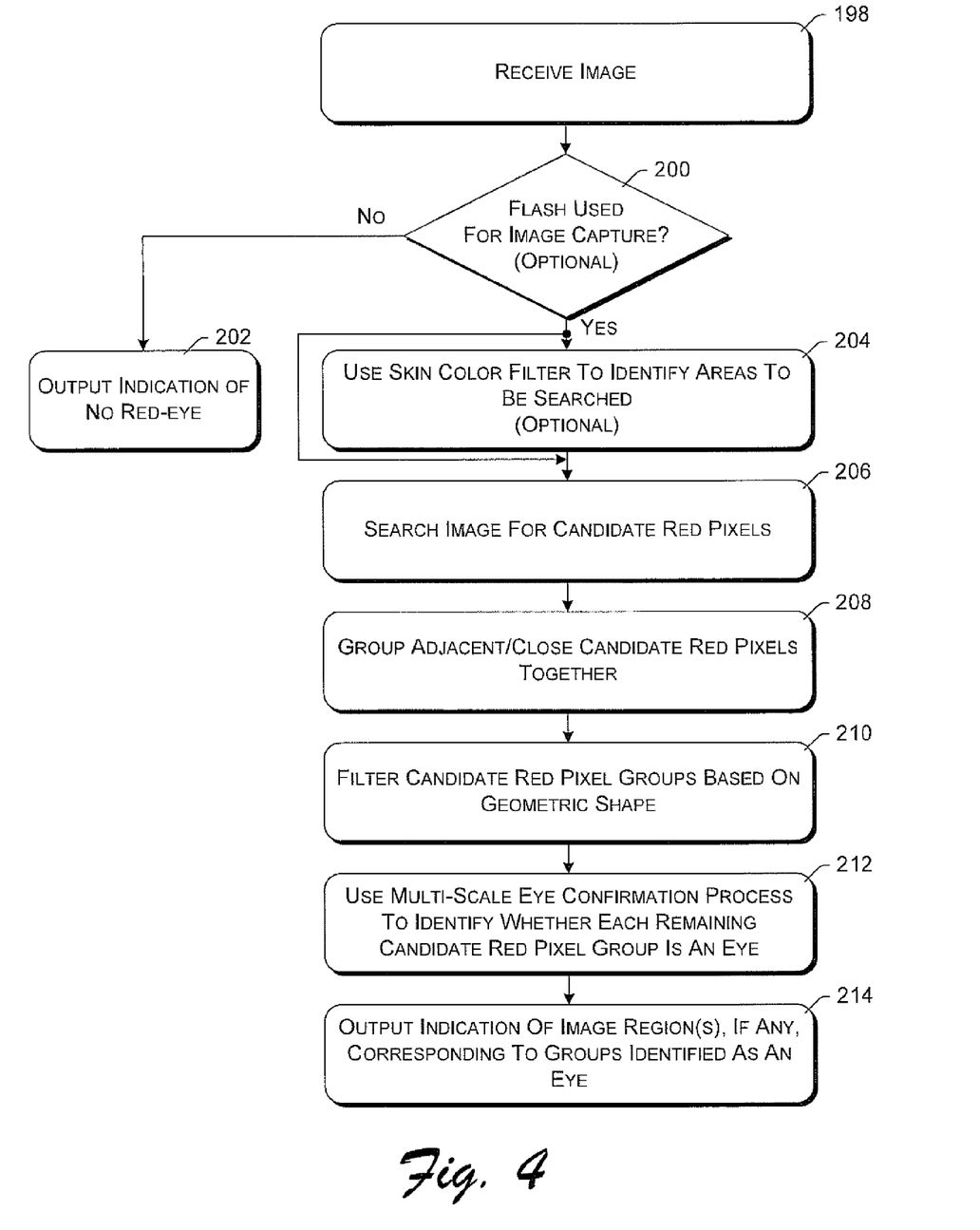
FIG. 4 is a flowchart illustrating an exemplary process for detecting red-eye regions in accordance with certain embodiments of the invention.

FIG. 4 is a flowchart illustrating an exemplary process for detecting red-eye regions in accordance with certain embodiments of the invention. The process of FIG. 4 is carried out by system 120 of FIG. 2, and may be implemented in software.

Initially, an image is received (act 198). Optionally, a check is then made as to whether a flash was used to capture the image (act 200). If no flash was used (or no return flash light detected) then an indication that the image contains no red-eye (act 202) and the process ends. However, if a flash was used, then red-eye may exist within the image. Skin color is optionally used to identify areas to be searched (act 204), after which the image is searched for candidate red pixels (act 206). If skin color is used to identify areas to be searched, then only those areas identified in act 204 are searched in act 206; otherwise, all (or most) of the pixels are searched in act 206.

The candidate red pixels that are adjacent (or close) to one another are then grouped together (act 208) and the red pixel groups are filtered based on a set of rules including geometric shape (act 210). The groups remaining after filtering in act 210 are the candidate red-eye regions, and a multi-scale eye confirmation process is used to identify whether each of the candidate red-eye regions is actually part of an eye (act 212). An indication is then output of each of the candidate red-eye regions, if any, identified as being part of an eye (act 214).

Figure 5:
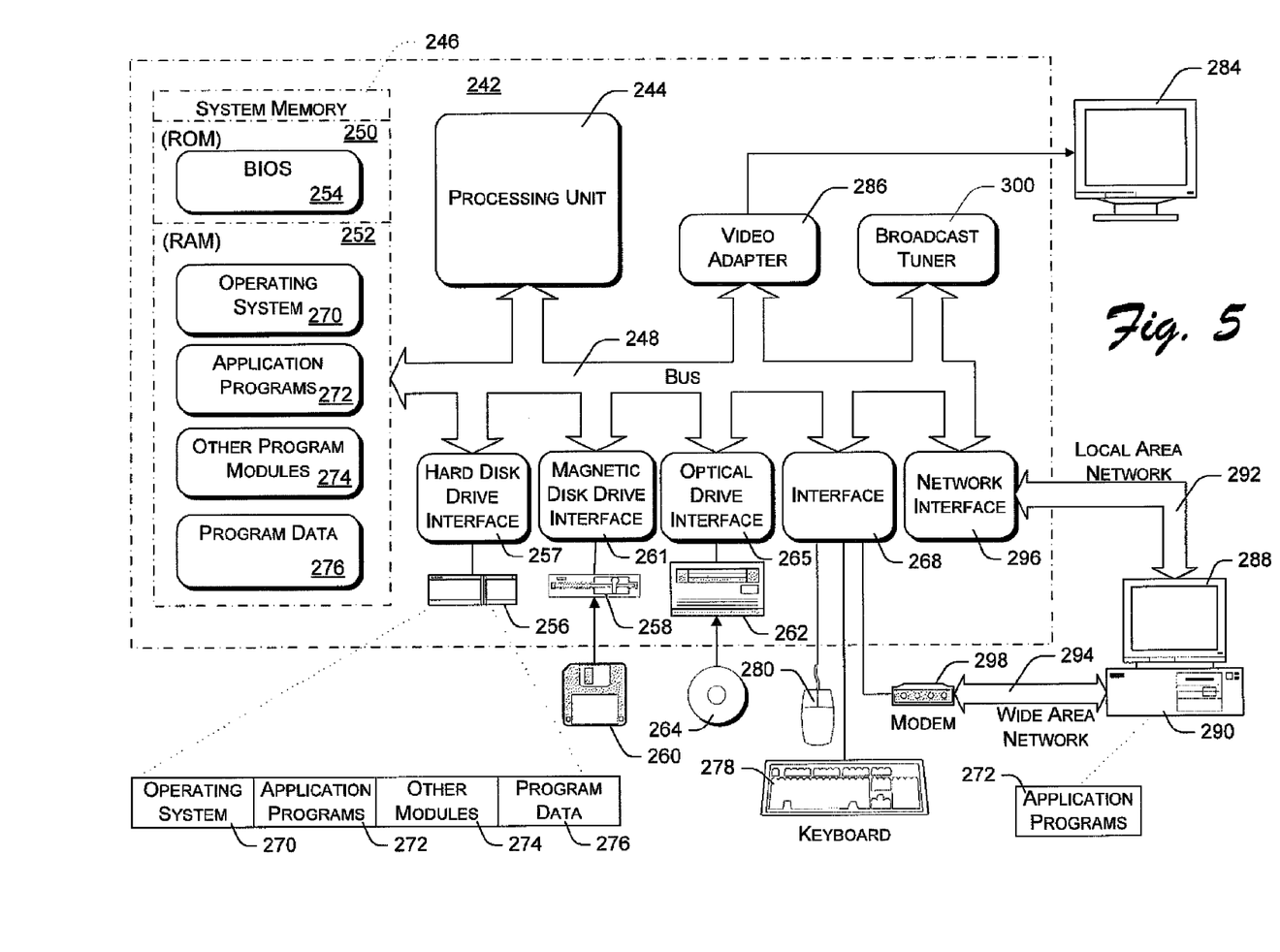
FIG. 5 illustrates an example of a suitable operating environment in which the invention may be implemented.

FIG. 5 illustrates an example of a suitable operating environment in which the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics (e.g., digital video recorders), gaming consoles, cellular telephones, image capture devices (e.g., digital cameras), network PCs, minicomputers, mainframe computers, distributed computing environments that include any of the above systems or devices, and the like.

FIG. 5 shows a general example of a computer 242 that can be used in accordance with certain embodiments of the invention. Computer 242 is shown as an example of a computer in which various embodiments of the invention can be practiced, and can be, for example, a computer 106 of FIG. 1, or a computer in which system 120 of FIG. 2 is implemented. Computer 242 is illustrated as only an example of a computing device that may be used with the invention; other devices may alternatively used that include more components or alternatively fewer components than those illustrated in FIG. 5. For example, a digital camera may include only a processing unit, bus, system memory, universal serial bus interface, and removable storage device.

Computer 242 includes one or more processors or processing units 244, a system memory 246, and a bus 248 that couples various system components including the system memory 246 to processors 244. The bus 248 represents one or more of any of several types of bus structures, including a memory bus or memory controller, a peripheral bus, an accelerated graphics port, and a processor or local bus using any of a variety of bus architectures. The system memory 246 includes read only memory (ROM) 250 and random access memory (RAM) 252. A basic input/output system (BIOS) 254, containing the basic routines that help to transfer information between elements within computer 242, such as during start-up, is stored in ROM 250.

Computer 242 further includes a hard disk drive 256 for reading from and writing to a hard disk, not shown, connected to bus 248 via a hard disk drive interface 257 (e.g., a SCSI, ATA, or other type of interface); a magnetic disk drive 258 for reading from and writing to a removable magnetic disk 260, connected to bus 248 via a magnetic disk drive interface 261; and an optical disk drive 262 for reading from and/or writing to a removable optical disk 264 such as a CD ROM, DVD, or other optical media, connected to bus 248 via an optical drive interface 265. The drives and their associated computer-readable media provide nonvolatile storage of computer readable instructions, data structures, program modules and other data for computer 242. Although the exemplary environment described herein employs a hard disk, a removable magnetic disk 260 and a removable optical disk 264, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 260, optical disk 264, ROM 250, or RAM 252, including an operating system 270, one or more application programs 272, other program modules 274, and program data 276. A user may enter commands and information into computer 242 through input devices such as keyboard 278 and pointing device 280. Other input devices (not shown) may include a microphone, joystick, game pad, satellite dish, scanner, or the like. These and other input devices are connected to the processing unit 244 through an interface 268 that is coupled to the system bus (e.g., a serial port interface, a parallel port interface, a universal serial bus (USB) interface, an IEEE 1394 (Firewire) interface, etc.). A monitor 284 or other type of display device is also connected to the system bus 248 via an interface, such as a video adapter 286. In addition to the monitor, personal computers typically include other peripheral output devices (not shown) such as speakers and printers.

Computer 242 operates in a networked environment using logical connections to one or more remote computers, such as a remote computer 288. The remote computer 288 may be another personal computer, a server, a router, a network PC, a peer device or other common network node, and typically includes many or all of the elements described above relative to computer 242, although only a memory storage device 290 has been illustrated in FIG. 5. The logical connections depicted in FIG. 5 include a local area network (LAN) 292 and a wide area network (WAN) 294. Such networking environments are commonplace in offices, enterprise-wide computer networks, intranets, and the Internet. In certain embodiments of the invention, computer 242 executes an Internet Web browser program (which may optionally be integrated into the operating system 270) such as the "Internet Explorer" Web browser manufactured and distributed by Microsoft Corporation of Redmond, Wash.

When used in a LAN networking environment, computer 242 is connected to the local network 292 through a network interface or adapter 296. When used in a WAN networking environment, computer 242 typically includes a modem 298 or other means for establishing communications over the wide area network 294, such as the Internet. The modem 298, which may be internal or external, is connected to the system bus 248 via a serial port interface 268. In a networked environment, program modules depicted relative to the personal computer 242, or portions thereof, may be stored in the remote memory storage device. It will be appreciated that the network connections shown are exemplary and other means of establishing a communications link between the computers may be used.

Computer 242 also includes a broadcast tuner 300. Broadcast tuner 300 receives broadcast signals either directly (e.g., analog or digital cable transmissions fed directly into tuner 300) or via a reception device (e.g., via antenna or satellite dish).

Computer 242 typically includes at least some form of computer readable media. Computer readable media can be any available media that can be accessed by computer 242. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 242. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer-readable storage media encoded with instructions that, when executed, cause a processor to perform acts comprising:
   receiving an image;
   searching a set of areas of the image for candidate pixels of one or more colors, wherein the one or more colors comprise colors corresponding to reflected light from a flash from a camera;
   combining the candidate pixels into a set of one or more pixel groups, wherein the combining comprises combining candidate pixels into the same group if the candidate pixels are adjacent one another; and
   filtering the pixel groups based on filling ratio, wherein the filling ratio comprises a number of reflected light pixels in the pixel group divided by a product of horizontal and vertical aspects of the pixel group.

2. The one or more computer-readable storage media as recited in claim 1, wherein the receiving comprises receiving the image from a camera.

3. The one or more computer-readable storage media as recited in claim 1, wherein the one or more colors comprises one or more shades of red.

* * * * *